(12) United States Patent
Geng et al.

(10) Patent No.: US 9,921,449 B2
(45) Date of Patent: Mar. 20, 2018

(54) ARRAY SUBSTRATE AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Miao Geng, Beijing (CN); Zhangfei Gao, Beijing (CN); Junhao Liu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/427,686

(22) PCT Filed: Jun. 12, 2014

(86) PCT No.: PCT/CN2014/079750
§ 371 (c)(1),
(2) Date: Mar. 12, 2015

(87) PCT Pub. No.: WO2015/096406
PCT Pub. Date: Jul. 2, 2015

(65) Prior Publication Data
US 2016/0033801 A1    Feb. 4, 2016

(30) Foreign Application Priority Data

Dec. 23, 2013   (CN) .......................... 2013 1 0721904

(51) Int. Cl.
*G02F 1/1339*   (2006.01)
*H01L 29/786*   (2006.01)
(Continued)

(52) U.S. Cl.
CPC .......... *G02F 1/1368* (2013.01); *G02F 1/1337* (2013.01); *G02F 1/1339* (2013.01);
(Continued)

(58) Field of Classification Search
CPC ... G02F 1/1339; G02F 1/1341; G02F 1/13452
See application file for complete search history.

(56) References Cited

U.S. PATENT DOCUMENTS

2010/0182530 A1* 7/2010 Fujikawa .............. G02F 1/1339
                                                        349/58
2013/0258257 A1* 10/2013 Liu ...................... G02F 1/1341
                                                       349/106
(Continued)

FOREIGN PATENT DOCUMENTS

CN          101153980 A      4/2008
CN          101211068 A      7/2008
(Continued)

OTHER PUBLICATIONS

Written Opinion of the International Searching Authority dated Sep. 30, 2014; PCT/CN2014/079750.
(Continued)

*Primary Examiner* — Raj R Gupta
(74) *Attorney, Agent, or Firm* — Ladas & Parry LLP

(57) ABSTRACT

An array substrate and a display device are disclosed. The array substrate includes a display area and a gate driver circuit located outside of the display area. The display area is covered with an alignment film, and the gate driver circuit is also covered with the alignment film. With the array substrate, damage, caused by static electricity generated between conductive particles in a sealant and the gate driver circuit, to the gate driver circuit can be effectively reduced.

20 Claims, 3 Drawing Sheets

(51) Int. Cl.
    *G02F 1/1368*    (2006.01)
    *G02F 1/1337*    (2006.01)
    *G02F 1/1345*    (2006.01)
    *G02F 1/1362*    (2006.01)

(52) U.S. Cl.
    CPC .................. *G02F 1/13454* (2013.01); *G02F 2001/136222* (2013.01)

(56) References Cited

U.S. PATENT DOCUMENTS

2014/0022479 A1* 1/2014 Hosaka ................. G02F 1/1368
                                                    349/43
2014/0092351 A1* 4/2014 Hatakeyama ......... G02F 1/1339
                                                   349/106

FOREIGN PATENT DOCUMENTS

| CN | 101681068 A | 3/2010 |
| CN | 101852951 A | 10/2010 |
| CN | 102955295 A | 3/2013 |
| CN | 203337943 U | 12/2013 |
| CN | 103676330 A | 3/2014 |
| WO | 2009/040967 A1 | 4/2009 |

OTHER PUBLICATIONS

International Search Report dated Sep. 10, 2014; PCT/CN2014/079750.
First Chinese Office Action Appln. No. 201310721904.9; dated Sep. 11, 2015.
Second Chinese Office Action dated Feb. 23, 2016; Appln. No. 201310721904.9.

* cited by examiner

ARRAY SUBSTRATE AND DISPLAY DEVICE

TECHNICAL FILED

The embodiments of the present disclosure relate to an array substrate and a display device.

BACKGROUND

With the development of thin film transistor-liquid crystal display (TFT-LCD) industry, narrow-frame vision effect becomes a mainstream trend of a high-quality display device. In order to further decrease the frame width of a display device, at present, the most popular method in the industry is to manufacture the gate driver circuit on the TFT array substrate, which is also called as gate driver on array (GOA). In this way, an independent gate driver IC is not needed, and the frame can be produced very narrow.

SUMMARY

At least one of the embodiments of present disclosure provides an array substrate, comprising a display area and a gate driver circuit located outside of the display area. The display area is covered with an alignment film, and the gate driver circuit is also covered with the alignment film.

At least one of the embodiments of present disclosure further provides a display device comprising the above-mentioned array substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

With respect to a twisted nematic (TN) type liquid crystal display device, the voltage of the common electrode on the color filter substrate is transmitted from the voltage on the array substrate by the conductive particles in sealant for forming a cell. For example, a certain number of conductive particles (for example, Au-balls) can be added in the sealant to realize the charge transfer between the color filter substrate and the array substrate.

Figure 1:
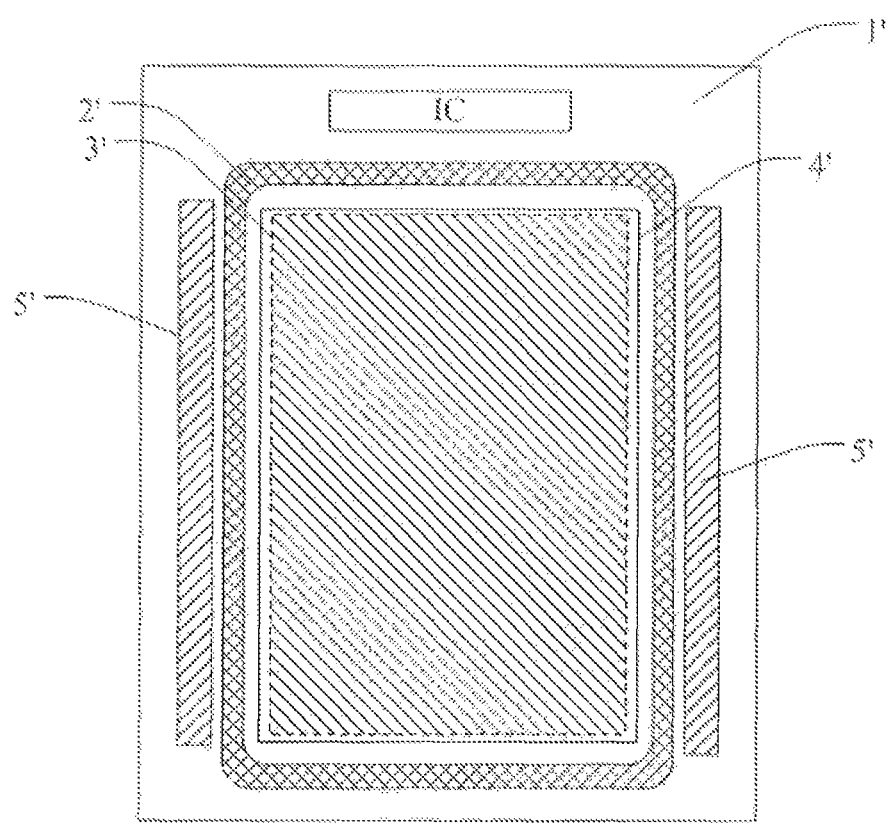
FIG. 1 is a structure schematic view showing a display device.

FIG. 1 shows a structure of a TFT display device driven by a GOA circuit. A driver IC is press welded on the array substrate 1', the GOA circuit is electrically connected to the driver IC, and the color filter substrate and the array substrate 1' are attached together by the sealant 2'. The effective display area is in the dashed line box 3', and a coverage area covered by the alignment film is in the solid line box 4' outer side of the dashed line box 3'. A GOA circuit 5' is disposed outside of the sealant 2' and is configured to receive the progressive-scanning gate line signals provided by the driver IC and transmit them to the gate electrodes of all the TFTs respectively. In order to further decrease the frame width of the display panel, the distance between the sealant 2' and the GOA circuit 5' is usually too small. Therefore, the Au-balls in the sealant 2' and the GOA circuit on the TFT side are easy to generate electrostatic discharge, and damages are caused to the GOA circuit on the TFT side.

At present, with respect to the TN mode narrow-frame product, in order to prevent the damage to the GOA circuit by the contact electrostatic between the conductive particles in the sealant and the GOA circuit on the TFT side, the main solution is to decrease the sealant width of the sealant 2'. However, it is easy to cause harmful effect by decrease of the sealant width of the sealant 2'. For example, it is easy to peel off the color filter substrate from the array substrate and cause leakage of liquid crystal (seal leakage), and the puncture risk of the liquid crystal also exists.

At least one of the embodiments of present disclosure provides an array substrate, comprising a display area and a gate driver circuit located outside of the display area. The display area is covered with an alignment film, and the gate driver circuit is also covered with the alignment film.

The array substrate provided by at least one of the embodiments of present disclosure, the gate driver circuit is covered with the alignment film, so that the gate driver circuit is isolated, and therefore damage, caused by static electricity generated between conductive particles in the sealant and the gate driver circuit, to the gate driver circuit can be effectively reduced.

Figure 2:
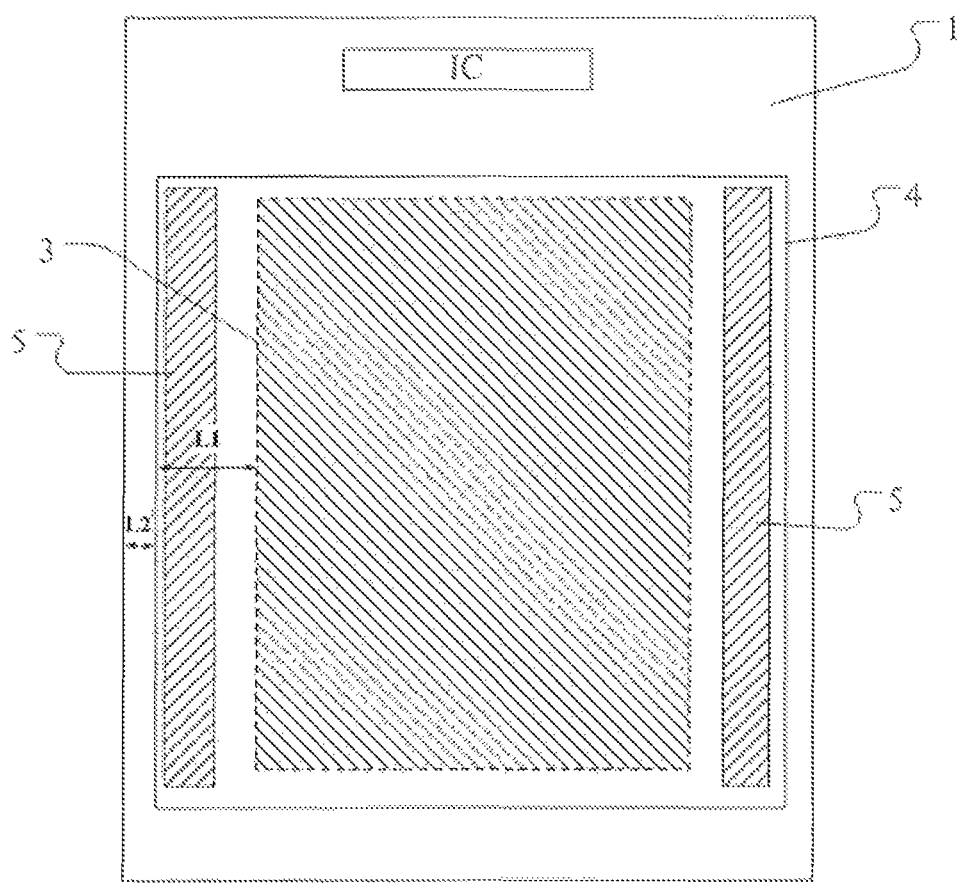
FIG. 2 is a structure schematic view showing an array substrate in an embodiment of present disclosure.

FIG. 2 shows a structure schematic view of the array substrate in one embodiment of present disclosure. The array substrate 1 comprises a gate driver circuit 5 and a display area located in the dashed line box 3, the gate driver circuit 5 disposed outside of the display area is used to provide progressive scan signals to the gate lines in the display area. The array substrate is further provided with an alignment film located in the solid line box 4, and the alignment film covers both the display area and the gate driver circuit 5.

The alignment film, for example, can be coated on the array substrate by spin coating, roller printing or the like, then rubbing or optical alignment process is performed to generate anisotropy, so that pre-orientation can be achieved to the liquid crystal molecules. The material of the alignment film, for example, may be polyimide or the like.

Moreover, the array substrate further comprises a driver IC, the driver IC is disposed on the area outside the coverage area covered by the alignment film. In one application of the product, for example, the driver IC is electrically connected to the GOA circuit.

Referring to FIG. 2, the distance L1 between the edge of the alignment film and the edge of the display area may be 1.2 mm to 1.6 mm.

Referring to FIG. 2, the distance L2 between the edge of the alignment film and the edge of the array substrate may be less than 0.2 mm. For example, the edge of the alignment film may be flush with the edge of the array substrate.

Moreover, at least one of the embodiments of present disclosure further provides a display device comprising any one of the above-mentioned array substrates. The display device can comprise any products or components having display function as follows: liquid crystal panel, e-Paper, mobile phone, panel computer, TV set, display apparatus, laptop, digital photo frame, navigation and the like.

Figure 3:
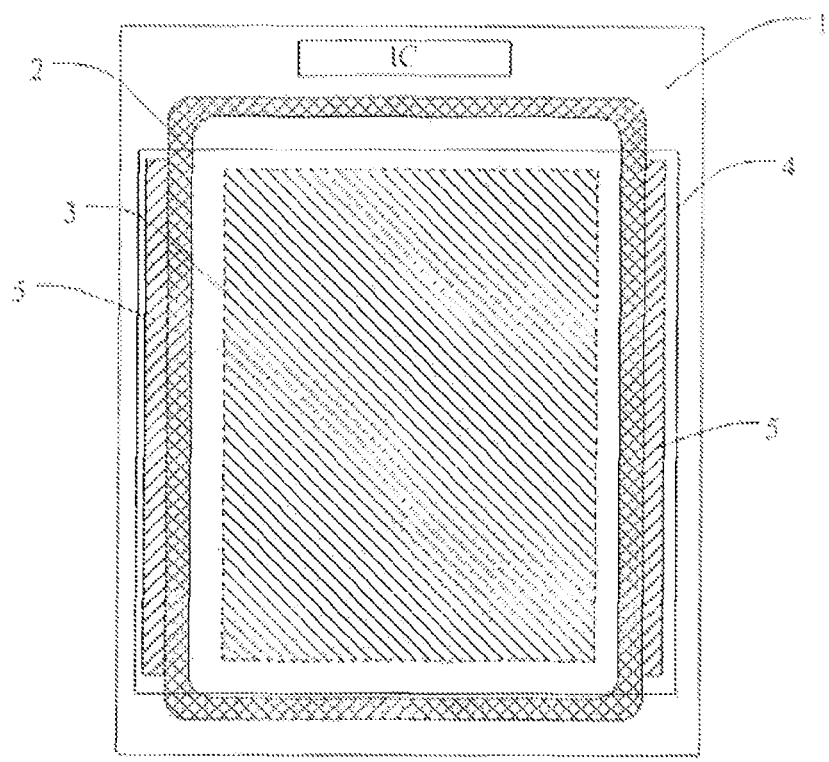
FIG. 3 is a structure schematic view showing a display device in an embodiment of present disclosure.
Figure 4:
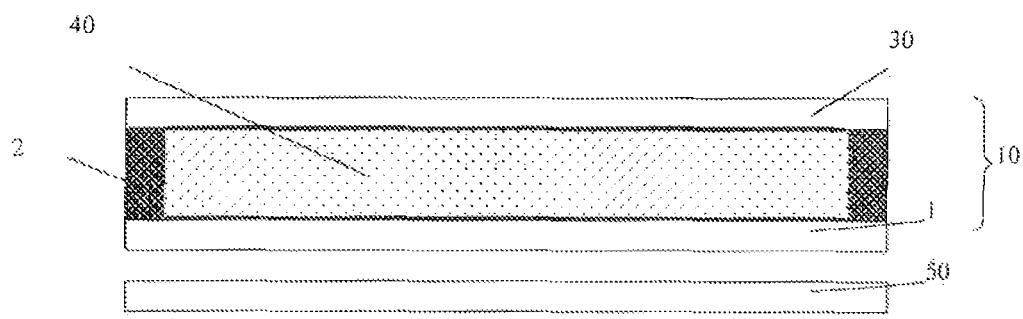
FIG. 4 is a cross-section schematic view showing a display device in an embodiment of present disclosure.

FIG. 3 shows a structure schematic view of a display device provided in one embodiment of present disclosure. FIG. 4 is a cross-section schematic view showing a display device in an embodiment of present disclosure. The display device 10 comprises a color filter substrate 30 and any one of the above-mentioned array substrates 1, and the color filter substrate 30 is assembled with the array substrate 1 via a sealant 2. The sealant 2 is disposed in the peripheral area outside the display area on the array substrate. The liquid crystal cell formed between the color filter substrate 30 and the array substrate 1 is filled with a liquid crystal material 40. Moreover, in one embodiment, the display device further comprises a backlight module 50 to provide light source for display.

In at least one embodiment of present disclosure, the sealant 2 may be disposed in the area outside the area covered by the alignment film, or may overlap the alignment film. For example, the sealant may partially overlap the alignment film, or may be completely disposed on the alignment film, and may be disposed on the coverage area of the alignment film and at the edge of the array substrate.

For example, in order to further narrow the frame of the display device, a portion of the sealant 2 may be disposed right above the gate driver circuit 5, that is, the alignment film is on the gate driver circuit 5, the portion of the alignment film on the gate driver circuit 5 overlaps with a portion of the sealant, so that the sealant width is no need to be decreased. Harmful effect to the display panel due to the decrease of the sealant width of the sealant can be avoided.

In the embodiment of present disclosure, the coverage area of the alignment film is broadened, the gate driver circuit is covered by the alignment film, so that the aim that the conductive particles in the sealant is isolated from the gate driver circuit by the alignment film is achieved, the direct connection between the conductive particles in the sealant and the gate driver circuit is avoided, and the damage, caused by the electrostatic discharge between the conductive particles and the gate driver circuit, to the gate driver circuit is decreased, and the fraction defective is also reduced.

In embodiments of present disclosure, it is no need to decrease the sealant width of the sealant to narrow the frame of the display device, the sealant can overlap the gate driver circuit, so that the risk such as seal leakage, puncture, peeling off and the like caused by decreasing the sealant width of the sealant can be decreased.

Because the coverage area of the alignment film is broadened, the edge of the alignment film is far away from the display area, and the risk to the display area caused by the uneven alignment of the edge of the alignment film is decreased.

What are described above is related to the illustrative embodiments of the disclosure only and not limitative to the scope of the disclosure; the scopes of the disclosure are defined by the accompanying claims.

The application claims priority under 35 U.S.C. 119 to Chinese Patent Application No. 201310721904.9, filed on Dec. 23, 2013, which is hereby incorporated by reference in its entirety.

What is claimed is:

1. An array substrate, comprising a display area and a gate driver circuit located outside of the display area, and a sealant which is disposed outside the display area on the array substrate, wherein the display area is covered with an alignment film, an entirety of the gate driver circuit is also covered with the alignment film, and the alignment film isolates the gate driver circuit from the sealant;

in a width direction of the gate driver circuit, the gate driver circuit is between an inner edge of the sealant, and, an edge of the alignment film;

in the width direction of the gate driver circuit, the edge of the alignment film is between an outer edge of the sealant and an, edge of the array substrate;

and in a length direction of the gate driver circuit, the gate driver circuit is between opposite edges of the alignment film, and a first size of the gate driver circuit in the length direction which, is perpendicular to the width direction is larger than a second size of the gate driver circuit in the width direction.

2. The array substrate according to claim 1, further comprising a driver IC, wherein the driver IC is disposed on the area outside the coverage area covered by the alignment film.

3. The array substrate according to claim 2, wherein a distance between the edge of the alignment film and an edge of the display area is 1.2 mm to 1.6 mm.

4. The array substrate according to claim 2, wherein a distance between the edge of the alignment film and the edge of the array substrate is less than 0.2 mm.

5. The array substrate according to claim 1, wherein a distance between the edge of the alignment film and an edge of the display area is 1.2 mm to 1.6 mm.

6. A display device comprising an array substrate according to claim 1.

7. The display device according to claim 6, further comprising a color filter substrate, wherein the color filter substrate is assembled with the array substrate via the sealant.

8. The display device according to claim 7, wherein the sealant at least partially overlaps the alignment film.

9. The display device according to claim 8, wherein the sealant is partially located on the alignment film.

10. The display device according to claim 7, wherein the sealant is partially located on the alignment film which covers the gate driver circuit.

11. The display device according to claim 6, wherein a portion of the sealant overlaps the gate driver circuit.

12. The display device according to claim 11, wherein the portion of the sealant overlaps a portion, on the gate driver circuit, of the alignment film.

13. The display device according to claim 6, wherein in the width direction of the gate driver circuit, the outer edge of the sealant is disposed between the display area and an outer edge of the gate driver circuit.

14. The display device according to claim 13, wherein the sealant comprises a first portion and a second portion which are opposite to each other and arranged along the length direction of the gate driver circuit; and along the length direction of the gate driver circuit, the gate driver circuit is disposed between the first portion and the second portion of the sealant.

15. The array substrate according to claim 1, wherein a distance between the edge of the alignment film and the edge of the array substrate is less than 0.2 mm.

16. A display device, comprising:
an array substrate, comprising a display area and a gate driver circuit located outside of the display area, wherein the display area is covered with an alignment film, and the gate driver circuit is also covered with the alignment film; and
a sealant, disposed outside the display area and on the array substrate, wherein
the sealant is isolated from the gate driver circuit by the alignment film;
in a width direction of the gate driver circuit, an edge of the alignment film is between the outer edge of the sealant and an edge of the array substrate;
in the width direction of the gate driver circuit, an outer edge of the sealant is disposed between the display area and an outer edge of the gate driver circuit; and
a first size of the gate driver circuit in a length direction which is perpendicular to the width direction is larger than a second size of the gate driver circuit in the width direction.

17. The display device according to claim 16, wherein a portion of the sealant overlaps the gate driver circuit.

18. The display device according to claim 17, wherein the portion of the sealant overlaps a portion, on the gate driver circuit, of the alignment film.

19. A display device, comprising:
an array substrate, comprising a display area and a gate driver circuit located outside of the display area, wherein the display area is covered with an alignment film, and an entirety of the gate driver circuit is also covered with the alignment film; and
a sealant, disposed outside the display area and on the array substrate, wherein a portion of the sealant overlaps the gate driver circuit and the sealant is isolated from the gate driver circuit by the alignment film;
in a width direction of the gate driver circuit, the gate driver circuit is between an inner edge of the sealant and an edge of the alignment film; and
in a length direction of the gate driver circuit, the gate driver circuit is between opposite edges of the alignment film, and a first size of the gate driver circuit in the length direction which is perpendicular to the width direction is larger than a second size of the gate driver circuit in the width direction.

20. The display device according to claim 19, wherein the portion of the sealant overlaps a portion, on the gate driver circuit, of the alignment film.

* * * * *